United States Patent
Elyagin et al.

(10) Patent No.: US 10,798,654 B2
(45) Date of Patent: Oct. 6, 2020

(54) METHOD TO DECREASE ENERGY CONSUMPTION FOR SENSOR NODES IN A WIRELESS SENSOR NETWORK

(71) Applicant: «TCT» Limited Liability Company, Ulyanovsk (RU)

(72) Inventors: Sergey Elyagin, Ulyanovsk (RU); Vitalii Dementev, Ulyanovsk (RU)

(73) Assignee: «TCT» Limited Liability Company, Ulyanovsk (RU)

( * ) Notice: Subject to any disclaimer, the term of this patent is extended or adjusted under 35 U.S.C. 154(b) by 0 days.

(21) Appl. No.: 16/411,773

(22) Filed: May 14, 2019

(65) Prior Publication Data
US 2019/0373548 A1    Dec. 5, 2019

(51) Int. Cl.
*H04W 52/02* (2009.01)
*H04W 84/18* (2009.01)

(52) U.S. Cl.
CPC ........ *H04W 52/0229* (2013.01); *H04W 84/18* (2013.01)

(58) Field of Classification Search
CPC ............ H04W 52/02; H04W 52/0229; H04W 52/0219; H04W 52/0274; H04W 52/383; H04W 52/46; H04W 84/18; H04W 52/0206; H04W 52/0216; H04W 88/02; H04W 88/0238; H04W 4/00; H04W 4/33; H04W 4/70; H04W 4/80; H04W 40/005; H04W 68/12
See application file for complete search history.

(56) References Cited

U.S. PATENT DOCUMENTS

| | | | | |
|---|---|---|---|---|
| 9,801,134 B2* | 10/2017 | Hwang | ............ | H04W 52/0229 |
| 2008/0070614 A1* | 3/2008 | Ogushi | ............ | H04W 52/0216 455/522 |
| 2009/0122737 A1* | 5/2009 | Twitchell, Jr. | .... | H04W 52/0219 370/311 |
| 2010/0150042 A1* | 6/2010 | Oh | .................... | H04W 52/0235 370/311 |
| 2015/0078228 A1* | 3/2015 | Schwoerer | ........ | H04W 52/0229 370/311 |

* cited by examiner

*Primary Examiner* — Mohamed A Kamara
(74) *Attorney, Agent, or Firm* — Nadya Reingand; Yan Hankin

(57) ABSTRACT

The invention is intended for wireless sensor networks with decreased energy consumption for sensor nodes. The sensor network is logically divided into k functionally independent wireless sensor local area networks (LANs), which operate in their own local frequency channel. The sensor nodes operate in low-power mode, receive power from a battery, and its receivers are periodically switched on for a short period of time to detect a wake-up message. One or more wireless sensor LANs are assigned to one of n wireless transponders that operate in a retranslation frequency channel, consume constantly supplied power from the receiver and transmitter, and ensure two-way communication between the central server and wireless sensor LANs. Sensor nodes are switched to an active state upon command from the central server. At the wake-up moment, the transponders switch to the local frequency channel of a wireless sensor LAN for a short period of time.

18 Claims, 2 Drawing Sheets

SNq - q-th sensor node
WRi - i-th wireless re-transmitters
OLWSNj - j-th local wireless sensor networks

METHOD TO DECREASE ENERGY CONSUMPTION FOR SENSOR NODES IN A WIRELESS SENSOR NETWORK

CROSS-REFERENCE TO RELATED APPLICATIONS

The present application claims priority to Russian patent application RU 2018120261 filed May 31, 2018.

FIELD OF INVENTION

The invention refers to a wireless sensor network in particular to ways of energy-efficient interaction of a large number of sensor nodes distributed over a large territory, for example, in multi-family multi-story buildings, other residential, public and industrial buildings and facilities.

BACKGROUND

In Russian Patent RU 2447508 the reduction of energy consumption in a wireless mesh network is disclosed. The method involves the fact that the wireless mesh network for data transmission periodically comes out of the waiting state, i.e. from the state when the power of the receiver and transmitter of the wireless mesh node is switched off.

The drawbacks of the described analog: 1) the relatively long periodic stay of the nodes of the wireless mesh network in the switched-on state, which is caused by the need to wait for data from the host computer even in their absence; 2) the need to transfer all the nodes of the wireless mesh network to the switched-on state, even if they are not participating in the current communication session; 3) the inability to perform data transfer at any time. Thus, the first and second points contribute to the excessive consumption of energy of the power source (battery).

Russian Patent Application RU 2006129314 discloses the way of functioning of the wireless device that includes the fact that a battery-powered wireless device is switched to a low-power state with the possibility of receiving a repeated wake-up information signal.

The drawbacks of the described device are: 1) the relatively long periodic stay of the wireless communication device in the switched-on state, which is caused by the need to wait the wake-up information signal; 2) the wake-up information signal at a particular point in time can be transmitted to only one wireless communication device, since the simultaneous operation of two wireless communication devices will lead to the loss of the transmitted information and the impossibility of detecting the wake-up; 3) A battery-powered wireless device cannot awaken other battery-powered wireless devices, which significantly limits the wireless network's capabilities.

The closest to the technical nature of the claimed invention is the selected prototype as a method of reducing the power consumption of the network infrastructure nodes in the wireless network, see Russian Patent No. 2492592, in which the sensor nodes are powered by a battery, the method comprising of the steps of turning the transmitter and receiver of the sensor node to an off-power state for each sensor node, turning on the power of the receiver of the sensor node during a limited time interval of scanning, turning on the power of the transmitter of the sensor node during a limited time interval of wakening signal Tm, turning on the power of the receiver of the sensor node, turn on the power of the transmitter of the sensor node during a limited time interval for the transmission or retransmission of a message to/from the central server.

The drawback of the described prototype is the use of the procedure of periodically turning on the transmitter of the sensor node, which contributes to unnecessary energy consumption of the power source (battery), and in case of loss of synchronism in the work of the neighboring sensor nodes, it is possible to transmit the wakening signal simultaneously to several sensor nodes, which will require additional time of active work of the sensor nodes with additional energy consumption of the power source to restore the normal operation, which eliminates the simultaneous transmission of wakening signals.

The technical task of the invention is to reduce the energy consumption of sensor nodes in a wireless sensor network ю

SUMMARY

In the wireless sensor network, the sensor nodes are powered by a battery. The proposed method comprises of the following steps:
 a) transferring the transmitter and receiver of the sensor node to a powered-off state;
 b) the power supply of the sensor node receiver is turned on during a limited time interval for scanning;
 c) turning on the power of the transmitter of the sensor node during a limited transmission time interval of the wakening signal $T_M$;
 d) turning on the power of the sensor node receiver, turning on the transmitter of the sensor node during a limited time interval for transmitting or retransmitting the message to/from the central server, periodically repeating steps a) and b) with period T.

The period T is less than the interval Tm.

In step b), a wakening signal a power level greater than the threshold is detected.

The wireless sensor network is logically divided into k functionally separate wireless sensor local networks that operate on their own local frequency channel in steps a)-c) and use a message retransmission procedure within the wireless sensor local network.

One or more wireless sensor local networks are assigned to one of the n wireless re-transmitters that operate on the frequency retransmission channel. Wireless re-transmitters use a confirmation regime of the message received that has the possibility of retransmission when the receiver and transmitter if switched-on at all times. Moreover, the first wireless rep-transmitter is connected to the central server, from which the message is transmitted to it and through subsequent wireless re-transmitters the message is transmitted to that wireless re-transmitter to which the wireless sensor local network is assigned to as specified in the message.

To wake up and transmit a message from a wireless re-transmitter to a given wireless sensor local network, the frequency channel of the wireless re-transmitter, for a limited wakening signal transmission time, is changed to the local frequency channel of the wireless sensor local network that is specified in the message. Then the wakening signal is sent and restored to the original frequency channel of the relay. Those sensor nodes that detect a wakening signal switch to a composite wake-up stage, during which they transit to step c), transmit a wakening signal, switch to step d), change the local frequency channel to the frequency retransmission channel and at a random time interval that is a multiple of the transmission time of a tag message, send the tag message. Further, other sensor nodes of the wireless sensor local network, which detect a wakening signal, are switched to a composite wake up stage. As a result, all the sensor nodes of a given wireless sensor local network are sequentially switched to an integral wake-up phase. The sensor nodes of the wireless sensor local network retransmit the tag messages and when the wireless re-transmitter receives a tag message in which the address of the sensor node matches the address of the message, the wireless re-transmitter sends the message to the wireless sensor local network specified in the message. The response message from the sensor node via the wireless re-transmitters is relayed to the central server, from which they then perform a dialogue with the specified wireless sensor local area network and/or send a message to end the communication session. After receiving the session termination message, all sensor nodes are transferred to repeating stages a) and b) and restore the local frequency channel.

If the sensors of the sensor node of a wireless sensor local network detect a physical impact, then the sensor node is switched to a composite wake-up stage. Then, other sensor nodes of the wireless sensor local network, which detect the wakening signal, are switched to the composite wake up stage, with sequential switching to the composite wake up stage of other sensor nodes. When a tag message is received on the wireless re-transmitter, an authorization message is sent to the wireless sensor area network from it. Then the message about the physical impact in the retransmission mode is sent from the sensor node to the sensor node specified in the message about the physical impact and/or to the central server, from which a dialogue with this sensor node is performed and/or a message is sent. Then, as in the case when the sensor nodes do not receive messages for a limited time interval at the composite wake-up stage, all sensor nodes are transferred to the recurrent steps a) and b) and the local frequency channel is restored.

DETAILED DESCRIPTION OF THE PREFERRED EMBODIMENT

Figure 1:
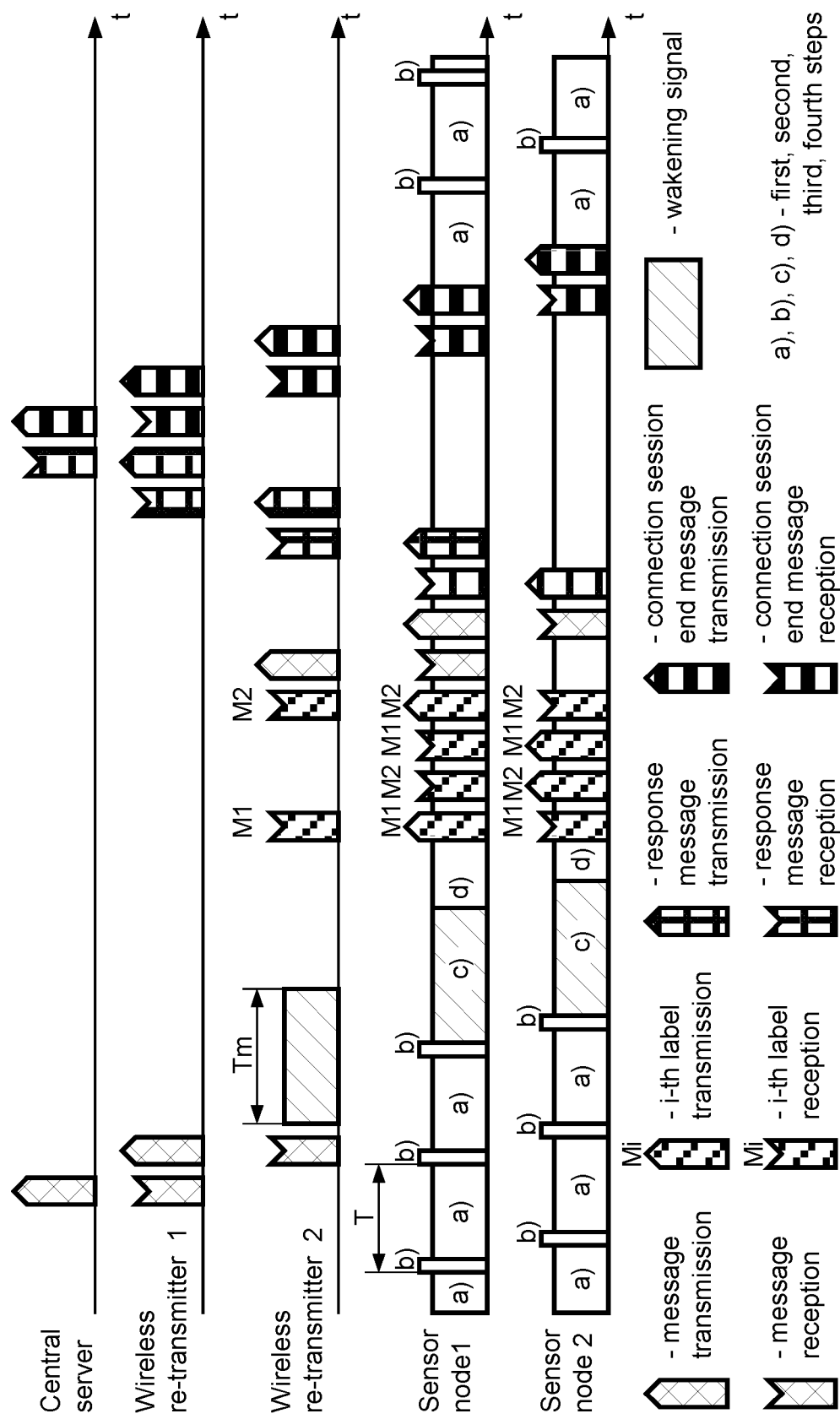
FIG. 1 is an example of the organization of a communication session between a central server and a given sensor node via two wireless re-transmitters and one sensor node.

The method of reducing the power consumption of sensor nodes in a wireless sensor network operates as follows: operation of the sensor nodes in the wireless sensor network generally looks like a change of various states associated with the performance of various functions and with different energy consumption from a battery power source. FIG. 1 shows the stages of the sensor node:
    stage a), in which the transmitter and receiver of the sensor node are switched to the power-off state in order to minimize power consumption;
    step b), in which the power supply of the sensor node receiver is switched on during a limited time interval for scanning in order to detect the wakening signal, and when it is detected, they exit this state therefore power is minimally consumed, and the contents of the wakening signal are not received or processed by the receiver, since they only detect wakening signal on a given frequency channel, provided that the power level from the initiator is above a threshold, which allows the sensor nodes to detect wakening signal from different initiators, besides the time interval for scanning are quite little here, because the actual message reception is not performed;
    stage c), where the transmitter of the sensor node is powered on during a limited time interval of wakening signal Tm to influence the neighboring sensor nodes and temporarily transfer them from the state of minimum power consumption to the active working state—the state of awakening. Wakening signal is a message that lasts for a time Tm, with the same content, since the effect is achieved due to its continuous transmission time;
    step d), where the sensor node receiver is powered on, the sensor node transmitter is powered on during a limited time interval for transmitting or retransmitting a message to/from the central server, this is actually the wake-up state in which the sensor node interacts with each other.

It should be noted that steps a) and b) are repeated periodically with a period T that is less than the limited time interval of transmission of wakening signal Tm, which allows the sensor nodes to confidently detect the wakening signal.

Figure 2:
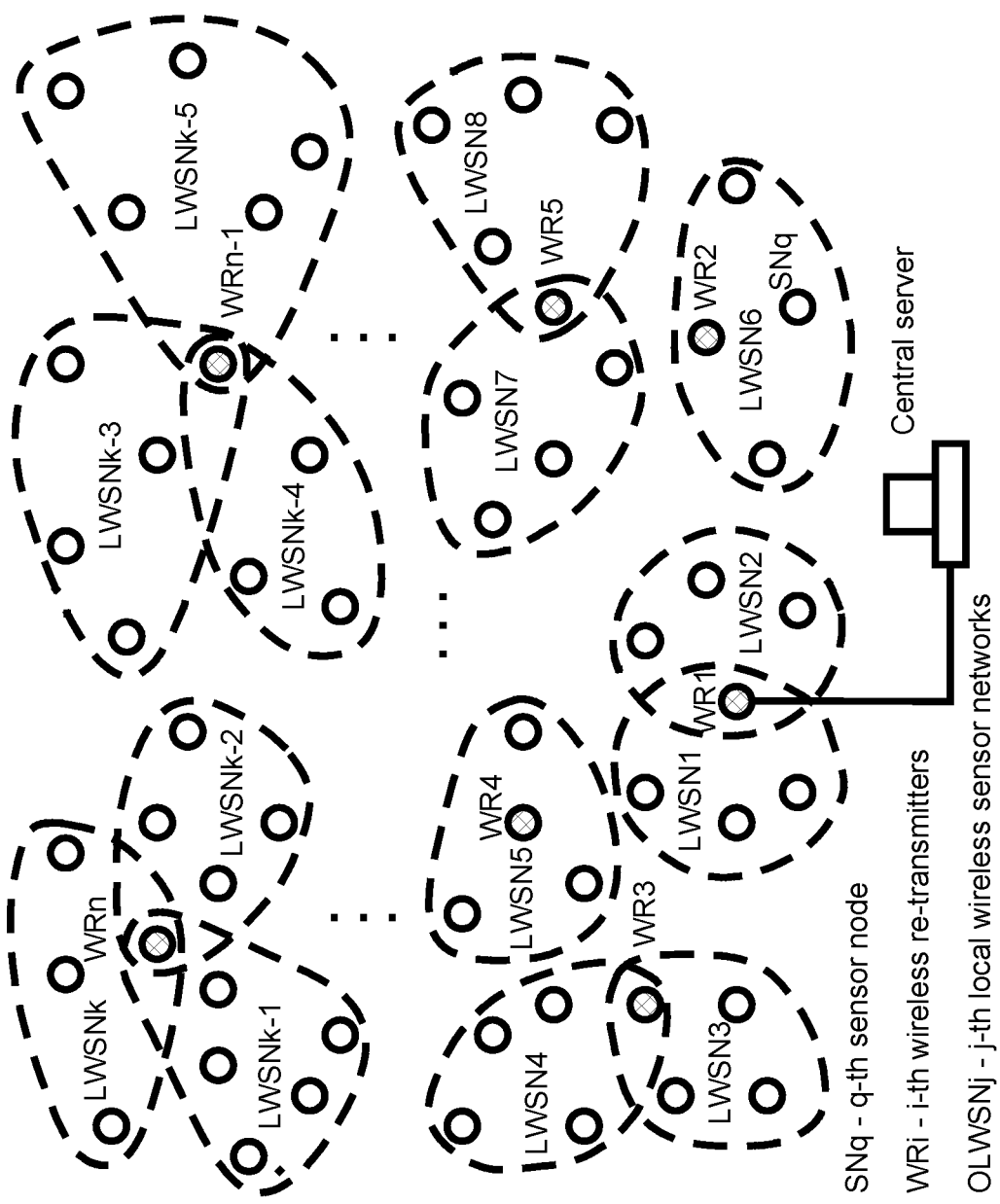
FIG. 2 is an embodiment of the topology of the wireless sensor network.

In most cases, the goal of the sensor networks is the transfer of information about the physical impact on the central server and the transfer of target indications from the central server to the sensor node, in some cases, provide for the interaction of some sensor nodes with each other. Based on the above said, in the proposed method, the wireless sensor network is logically divided into k functionally isolated wireless sensor local area networks, which operate on their own local frequency channel in steps a)-c) and use the procedure of relaying messages within the wireless sensor local network. To ensure the exchange of information between wireless sensor local networks and the central server, n wireless re-transmitters are additionally introduced, with one or more wireless sensor local networks assigned to one wireless re-transmitter. All wireless re-transmitters operate on the frequency retransmission channel, use the acknowledgment mode to confirm the receipt of the message with the possibility of retransmission, use the receiver and transmitter that are constantly powered on, which ensures guaranteed delivery of information. The first wireless repeater is connected to a central server using standard interfaces (for example, a virtual com port over USB interface). FIG. 2 shows a variant of the wireless sensor network topology. At the same time, the placement of wireless repeaters should provide coverage for a given wireless sensor network.

FIG. 1 shows an example of the organization of a communication session. The specified sensor node 2 is located in a wireless sensor local area network attached to a wireless re-transmitter 2. FIG. 1 shows the process of sending a single message with the subsequent termination the communication session.

When sending a message from a central server to a given sensor node of a given wireless sensor local network, the message includes the address of the sensor node, the number of the local frequency channel and the number of the wireless sensor local network. The message is then transmitted to the first wireless re-transmitter and, using the relay process, the message is transmitted via the wireless re-transmitter to the wireless re-transmitter to which the wireless sensor local network is assigned as specified in the message. After that, for a limited time interval of the transmission of the wakening signal, this wireless re-transmitter changes the frequency channel of the re-transmitter to the local frequency channel of the wireless sensor local area network indicated in the message, sends the wakening signal, restores the original frequency channel of the re-transmitter. At the same time, those sensor nodes that detect the wakening signal switch to the composite wake-up stage, during which they transfer to step c), transmit the wakening signal, switch to step d), change the local frequency channel to the frequency retransmission channel, and after a random time interval, a multiple of the transfer time of the tag message, send the tag message. The delay in the transmission of the tag message over a random time interval is necessary for the time-separated process of transmission by several sensor nodes that simultaneously detect the wakening signal. The tag message includes the address of the sensor node and the number of the wireless sensor local networks. Furthermore, other sensor nodes of the wireless sensor local network, which detect a wakening signal from previous sensor nodes, switch to a composite wake-up stage. Thus, all sensor nodes of the wireless sensor local area network are sequentially switched to a composite wake up stage. In this case, the sensor nodes of the wireless sensor local network retransmit the tag messages and when the wireless re-transmitter receives a tag message in which the address of the sensor node matches the address of the message, the wireless repeater sends the message to the wireless sensor local network specified in the message. The response message from the sensor node via wireless re-transmitters is relayed to the central server, from which they then perform a dialogue with the specified wireless sensor local network and/or send a message to end the communication session, after receiving which all sensor nodes are transferred to recurrent steps a) and b) and restore the local frequency channel. Thus, the sensor nodes are forcibly transferred to the low-power state.

In case if the sensors of a sensor node of a wireless sensor local network detect a physical impact, the sensor node is switched to a composite wake-up stage. Then, other sensor nodes of the wireless sensor local network, which detect a wakening signal from the previous sensor nodes, switch to a composite wake-up phase. As a result, all sensor nodes sequentially switch to a composite wake-up phase. When any tag message is received on the wireless re-transmitter, an authorization message is sent from it to the wireless sensor local network. After that, a message about the physical impact is sent from the sensor node to the sensor node specified in the message about the physical impact on the central server and/or the sensor node. When the message about the physical impact is taken by a given sensor node, it will follow the instructions contained in the message about the physical impact. When the physical impact message is received by the central server, it performs a dialogue with this sensor node and/or sends a message to end the communication session, after which all sensor nodes are transferred to recurrent steps a) and b) and restore the local frequency channel. Thus, the sensor nodes forcibly return to a low power state. It should be noted that the sensor nodes independently go into a low-power state if they do not receive any messages for a limited time interval at the composite wake-up stage.

Since, when transmitting a wakening signal, the wireless re-transmitters temporarily change the frequency channel of the re-transmitter to the local frequency channel of the wireless sensor local network, it is possible that messages transmitted by the wireless re-transmitters in the relay mode on the frequency channel of the re-transmitter are lost. To eliminate the loss of messages by the wireless re-transmitters, the mode of acknowledgment of receipt of a message with the possibility of retransmission is used.

In addition, the wireless re-transmitters use a message buffering procedure while simultaneously servicing more than one wireless sensor local network, which eliminates packet loss.

The inventive method can be carried out when implementing the technological process of the "smart home" in an apartment building. For this matter:

a. Each wireless re-transmitter and sensor node is assigned a unique address and a number of technological parameters (frequency channel, transmitter power, modulation type, maximum length of the transmitted message, etc.) specific to the specific hardware implementation of these devices;
b. Install of the wireless re-transmitters on the stairwells of each floor of the building;
c. Sensor nodes are placed in a given or in all apartments, which, within the boundaries of a separate apartment, form a wireless sensor local network;
d. In the attic or in the basement, a central server is placed with the ability to access the global Internet network (if necessary).

The advantages of this method are the following:

a. Reducing transit traffic, due to the separation of functionally unrelated wireless sensor local networks. That reduces the active working time of the sensor nodes and battery consumption;
b. The ability to communicate with any sensor node at an arbitrary point in time from both the central server and any other sensor node of this wireless sensor local network;
c. The possibility of parallel independent operation of the wireless sensor local networks, including offline, i.e. without the participation of the central server;
d. In the low-power state, a short-term switching on of the receiver of the sensor node is performed, and this is a much less energy-intensive process compared with the periodic sending of a wakening signal as in the considered analogues;
e. Since the wakening signal is detected as a radio signal on a given frequency channel with a power level higher than the threshold, the scanning time interval for detecting the wakening signal is sufficiently small because it does not need to receive the content of the wakening signal, therefore, the time of battery power consumption is reduced.

The proposed method of reducing the energy consumption of sensor nodes in a wireless sensor network is of considerable interest, as it allows organizing, for example, such complex technological processes as a "smart home" in apartment buildings in the interests of individual apartments, but subject to overall control.

The proposed method of reducing the power consumption of sensor nodes in a wireless sensor network does not adversely affect the environment because it operates in an unlicensed frequency band and uses low-power radio transmitters with a maximum power of 10 dBm and can be implemented on modern microcontrollers, such as CC430F5137. This microcontroller allows you to detect a radio signal in a given frequency channel with a given power level. In addition, in one package it contains both a transceiver and a microcontroller.

What is claimed is:
1. A method of reducing energy consumption of sensor nodes in a wireless sensor network, comprising:

the sensor nodes are alternating a power-on and a power-off stage during a period T, all sensors nodes of the same rank, without hierarchy;

turning on a power of at least a first sensor node by a wakening signal from an initiator;

transmitting the wakening signal from a first wakened sensor node to at least a second sensor node within a limited time interval Tm thus wakening at least the second sensor node;

thus, sequentially wakening up all sensor nodes of the wireless sensor network; wherein period T is less than interval Tm;

transmitting a message from the initiator to any of the sensor nodes or transmitting a message from any of the sensor nodes to the initiator or from one sensor node to another sensor node;

after completing of the transmission of the message all sensor nodes return to power-on-power-off regime during each period T;

wherein the turning on the power of at least the first sensor node is performed if the power level of the wakening signal from the initiator is above a threshold.

2. The method of 1, wherein none of sensor nodes analyzes information in the wakening signal.

3. The method of claim 1, wherein the wireless sensor network is logically divided into K functionally segregated local wireless sensor networks which work on their own local frequency.

4. The method of claim 3, wherein at least one of K local wireless sensor networks is assigned to one of n wireless re-transmitters, wherein each re-transmitter operates on its own frequency retransmission channel which differs from a local frequency of channels of local networks.

5. The method of claim 4, wherein the wireless re-transmitters use a message receipt confirmation mode supporting a possibility of a repeated message transmission and use a constantly powered receiver and a constantly powered transmitter.

6. The method of claim 4, wherein the wakening signal is sent on a local frequency channel to a corresponding local wireless network.

7. The method of claim 4, wherein the messages are sent on a frequency of a retransmission channel.

8. The method of claim 4, wherein a first wireless re-transmitter is connected to a central server.

9. The method of claim 8, wherein a message is transmitted from the central server via the wireless re-transmitters to that wireless re-transmitter to which a wireless local network is assigned as specified in the message, this message is saved in the wireless re-transmitter.

10. The method of claim 9, wherein for a limited time interval of the wakening signal transmission, the frequency retransmission channel of the wireless re-transmitter is changed to a local frequency channel of the local wireless sensor network as specified in the message, the wakening signal is transmitted and after that, the frequency of the retransmission channel is restored.

11. The method of claim 1, which includes two or more sensor nodes, each sensor node contains at least one receiver and at least one transmitter.

12. The method of claim 11, in which the message transmission or repeated message transmission to and from a central server is carried out at a random time interval, which is being multiple of a message transmission time.

13. The method of claim 1, in which after awakening, the first sensor node switches from a local frequency channel to a retransmission frequency channel and after a random time interval, which is being multiple to a message transmission time, sends a tag message.

14. The method of claim 13, in which after the wireless re-transmitter receives the tag message from the sensor node, a number which is specified in the message is stored in the wireless re-transmitter, and the message is transmitted to a local wireless sensor network.

15. The method of claim 13, in which after the wireless re-transmitter receives a response message from the sensor node, the message is retransmitted via wireless re-transmitters to a central server.

16. The method of claim 1 in which the sensor nodes, after receiving a message of an end of a connection session, return to power-on-power-off regime during each period T.

17. The method of claim 1, where power-on time is at least 1000 times less than the power-off time.

18. The method of claim 1, in which the initiator or the sensor node or a central server which discovered a change of a controllable physical parameter, including pressing of a button, change in a pressure from the sensor, initiates an inquiry of the sensor nodes.

* * * * *